United States Patent
Hu et al.

(10) Patent No.: US 11,907,089 B2
(45) Date of Patent: Feb. 20, 2024

(54) METHOD AND APPARATUS FOR REPAIRING GPU VIDEO MEMORY ACCESS BASED ON ACTIVE ERROR DETECTION

(71) Applicant: Wuhan Lingjiu Microelectronics Co., Ltd., Hubei (CN)

(72) Inventors: Yanming Hu, Hubei (CN); Peiwen Zhou, Hubei (CN); Tao Guo, Hubei (CN); Zhenqing Ding, Hubei (CN); Tianyue Liu, Hubei (CN)

(73) Assignee: Wuhan Lingjiu Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/078,498

(22) Filed: Dec. 9, 2022

(65) Prior Publication Data

US 2023/0376393 A1 Nov. 23, 2023

(30) Foreign Application Priority Data

May 19, 2022 (CN) .......................... 202210543511.2

(51) Int. Cl.
*G06F 11/27* (2006.01)
*G06F 11/16* (2006.01)
*G06F 11/22* (2006.01)

(52) U.S. Cl.
CPC .......... *G06F 11/27* (2013.01); *G06F 11/1658* (2013.01); *G06F 11/2221* (2013.01)

(58) Field of Classification Search
CPC ... G06F 11/27; G06F 11/1658; G06F 11/2221
USPC ........................................................ 714/764
See application file for complete search history.

(56) References Cited

U.S. PATENT DOCUMENTS

| | | | |
|---|---|---|---|
| 10,776,235 B2 * | 9/2020 | Viggers | G06F 11/2236 |
| 11,500,711 B1 * | 11/2022 | Kolesinski | G06T 1/60 |
| 2017/0177458 A1 * | 6/2017 | Viggers | G06F 11/263 |
| 2020/0192420 A1 * | 6/2020 | Irshad | G09G 5/39 |

* cited by examiner

*Primary Examiner* — James C Kerveros
(74) *Attorney, Agent, or Firm* — Hoffmann & Baron, LLP

(57) ABSTRACT

It is suitable for the field of computer graphic processing technologies, and provides a method and apparatus for repairing a graphics processing unit (GPU) video memory access based on active error detection. A small video memory is first distributed and used for error detection of video memory access, and a problem of video memory data access abnormality is found in time through a regular active detection. When the video memory data access abnormality is found, a GPU desktop driving module can suspend a display picture update operation, and a GPU kernel driving module first suspends all video memory access, then re-initializes a video memory controller and repairs the video memory access abnormality, and then restores an access of all the modules to a video memory to normal, refreshes a desktop, and restores a graphic desktop to a normal state.

6 Claims, 3 Drawing Sheets

METHOD AND APPARATUS FOR REPAIRING GPU VIDEO MEMORY ACCESS BASED ON ACTIVE ERROR DETECTION

CROSS-REFERENCE TO RELATED APPLICATIONS

This patent application claims the benefit and priority of Chinese Patent Application No. 202210543511.2, entitled "Method and Apparatus for Repairing GPU Video Memory Access Based on Active Error Detection" filed with the China National Intellectual Property Administration on May 19, 2022, the disclosure of which is incorporated by reference herein in its entirety as part of the present application.

TECHNICAL FIELD

The present disclosure relates generally to the technical field of computer graphic processing, and in particular, to a method and apparatus for repairing a graphics processing unit (GPU) video memory access based on active error detection.

BACKGROUND

When a graphics processing unit (GPU) performs computer graphics rendering and digital graphics display output, a large amount of graphics-related data is stored in a video memory of the GPU, and the GPU needs to frequently access the video memory data. If the GPU accesses data of the video memory abnormally, it will cause serious abnormality such as a rendering image error and a blurred screen of a display picture. High-speed synchronous dynamic random access memories such as a DDR2, a DDR3, and a DDR4 are generally adopted for the video memories of the GPU. Due to a high data transmission frequency, a video memory interface of the GPU also has high requirements on circuit timing. A video memory controller of the GPU calibrates the interface timing when the video memory is initialized. However, in a long running process, due to the impact of adverse environmental factors such as voltage fluctuation and temperature drift, timing calibration failure may occur in the interface timing with a certain possibility, and thus an error occurs in the video memory data access and such video memory data access cannot be automatically restored.

The timing calibration failure belongs to the category of hardware faults, and is related to timing design and power ripple of hardware circuit, and the like. Currently, a method which optimizes a circuit design to improve the signal quality of the video memory interface is adopted, but optimizing the circuit design usually requires redesigning a printed circuit board, which has a long time cycle and high costs. In fact, due to the impact of the temperature drift effect of the clock and the power ripple, although the effect of the circuit method has been improved, the video memory calibration failure problem cannot be resolved completely. Generally, there is a relatively low probability of video memory calibration failure, and once the video memory calibration failure occurs, the video memory calibration cannot be automatically restored, resulting in the poor user experience, and the problem cannot be resolved really.

In addition, some advanced video memory controllers support a dynamic timing calibration function and can resolve the problem, but will increase the design complexity of the video memory controller and an occupied wafer area, resulting in an increase in the costs of GPU chip design manufacturers to purchase video memory controller IP and chip wafers. In addition, due to limitations on technical capacity and patent barriers, some domestic video memory controllers and low-end video memory controllers usually do not support dynamic video memory calibration technologies. For GPU chips that already adopt such video memory controllers, if the GPU video memory controllers are redesigned and taped out, the tape-out cost and the time cost of the GPU chips are also very high.

SUMMARY

In view of the foregoing problems, the present disclosure aims to provide a method and apparatus for repairing a GPU video memory access based on active error detection, to resolve the existing technical problem of a video memory data access error caused by a failure for timing calibration of a video memory interface.

In an aspect, a method for repairing a GPU video memory access based on active error detection is provided, including following steps:
step S1: distributing a small video memory test space for data read and write detection, and regularly and actively detecting whether read and write of data in the video memory test space is normal;
step S2: transmitting, if the data read and write detection on the video memory test space fails, a trigger instruction to control a GPU desktop driving module to suspend access operations to a video memory and control a GPU kernel driving module to suspend access operations of all hardware modules to the video memory, then resetting and re-initializing a video memory controller, to re-calibrate timing of a video memory interface, and finally restoring the access operations of all the hardware modules to the video memory, and restoring normal access of the video memory interface; and
step S3: performing, by the GPU desktop driving module, a complete desktop refresh operation, and restoring all the access operations of the GPU desktop driving module to the video memory.
Further, step S1 may include:
distributing the small video memory test space for the data read and write detection, where the video memory test space is two times or four times a width of video memory data; and
regularly triggering the data read and write detection on the video memory test space, where the detection includes: randomly writing a group of data into the video memory test space, and then reading out the data and performing correctness verification on the data, where if the read data is consistent with the previously written data, it indicates that read and write is normal, and if the read data is inconsistent with the previously written data, it indicates that the read and write detection fails.
Further, in step S2, after receiving the trigger instruction, the GPU kernel driving module may perform following operations:
suspending the access operations of the hardware modules such as a 2D module, a 3D module, a video processing unit (VPU) module, a direct access media (DMA) module, and the video memory controller to the video memory;
resetting and re-initializing the video memory controller; and restoring the access operations of the hardware modules such as the video memory controller, the DMA module, the VPU module, the 3D module, and the 2D module to the video memory.

Further, step S3 may include:

setting a full screen update mark, to ensure that an entire desktop picture is updated in next desktop updating;

restoring to a normal graphics desktop drawing operation process; and restoring regular data read and write detection on the video memory test space.

In another aspect, an apparatus for repairing a GPU video memory access based on active error detection is provided, including:

a regular detection module, configured to distribute a small video memory test space for data read and write detection, and regularly and actively detect whether read and write of data in the video memory test space is normal;

an instruction trigger module, configured to transmit a trigger instruction when the data read and write detection on the video memory test space fails;

a GPU desktop driving module, configured to suspend access operations to a video memory when receiving the trigger instruction, perform a complete desktop refresh operation after restoring an access to a video memory interface to normal, and restore all the access operations to the video memory; and a GPU kernel driving module, configured to suspend access operations of all hardware modules on a video memory when receiving the trigger instruction, then reset and re-initialize a video memory controller, to re-calibrate timing of the video memory interface, and finally restore the access operations of all the hardware modules to the video memory and restore the access to the video memory interface to normal.

Further, the regular detection module may include:

a video memory distribution unit, configured to distribute the small video memory test space for data read and write detection, where the video memory test space is two times or four times a width of video memory data; and a regular detection unit, configured to regularly trigger the data read and write detection on the video memory test space, where the detection includes: randomly writing a group of data into the video memory test space, and then reading out the data and performing correctness verification on the data, where if the read data is consistent with the previously written data, it indicates that read and write is normal, and if the read data is inconsistent with the previously written data, it indicates that the read and write detection fails.

Further, the GPU kernel driving module may include:

a module suspending unit, configured to suspend the access operations of the hardware modules such as a 2D module, a 3D module, a VPU module, a DMA module, and the video memory controller to the video memory;

a controller initialization unit, configured to reset and re-initialize the video memory controller; and a module restoration unit, configured to restore the access operations of the hardware modules such as the video memory controller, the DMA module, the VPU module, the 3D module, and the 2D module to the video memory.

Some beneficial effects of the present disclosure are as follows: In the present disclosure, by using a regular active error detection mechanism, an access fault of a video memory interface is actively found in time, then all access transactions to a video memory are suspended and timing of the video memory interface is actively re-calibrated, and finally a spot is restored to restore the access fault of the video memory interface and resolve an access fault of the video memory caused by a failure for timing calibration of the GPU video memory interface. In addition, through a technical solution of the present disclosure, without modifying a hardware circuit or chip design, a hardware problem is avoided through a software method, a relatively good effect can be obtained for some access faults of the video memory occurring in a low probability, and a case that a graphical user interface (GUI) is always in a blurred screen state after failing and can be restored to normal by rebooting the computer, resulting in poor user experience is avoided.

DETAILED DESCRIPTION OF THE PREFERRED EMBODIMENTS

In the embodiments of the present disclosure, by setting a regular active error detection mechanism, an access fault of a video memory interface is found in time, then all access transactions to a video memory are suspended and timing of the video memory interface is actively re-calibrated, and finally a spot is restored, to restore the access fault of the video memory interface. To make the objectives, technical solutions, and advantages of the present disclosure more readily apparent, the present disclosure is further described below in detail with reference to the drawings and embodiments. It should be understood that the specific embodiments described herein are merely intended to explain the present disclosure but not to limit the present disclosure.

To describe the technical solutions described in the present disclosure, specific embodiments are used for description below.

Embodiment 1

Figure 1:
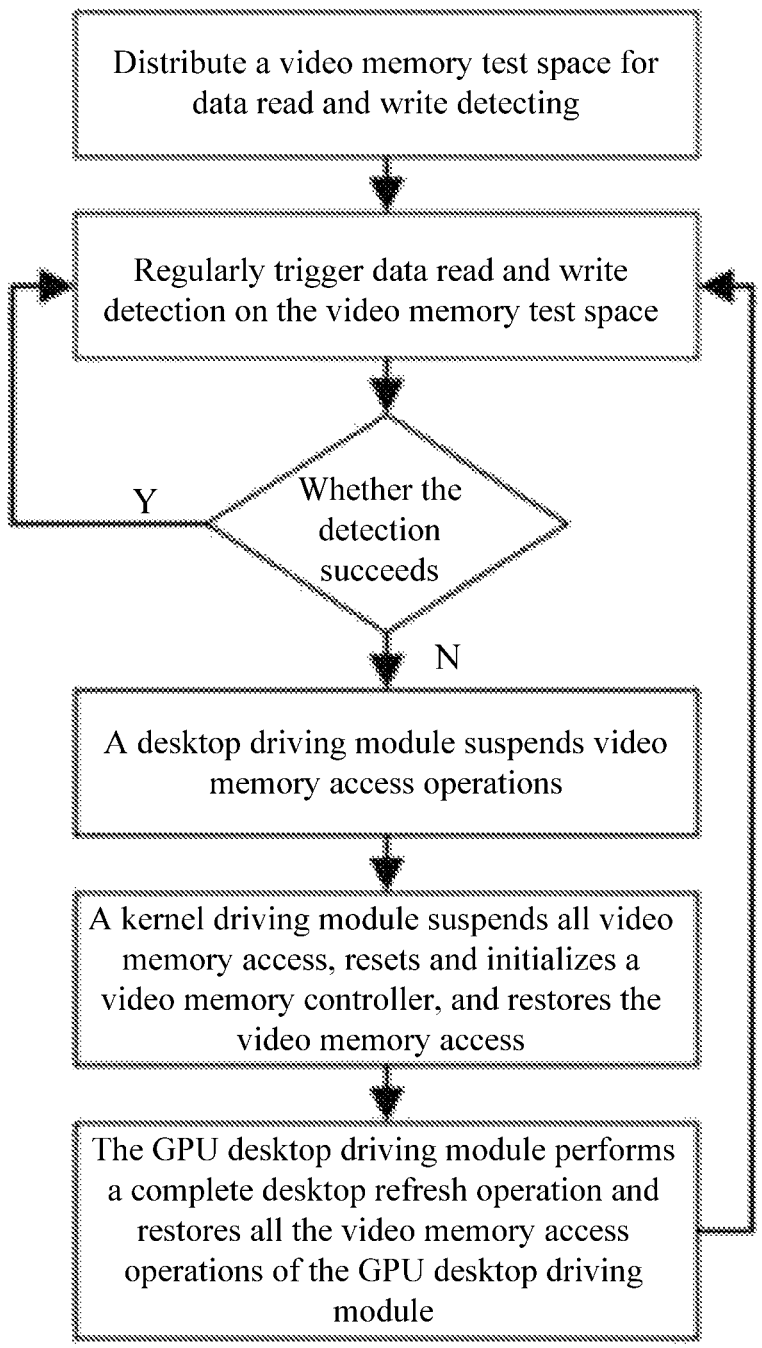
FIG. 1 is a flowchart of a method for repairing a GPU video memory access based on active error detection according to a first embodiment of the present disclosure.

FIG. 1 illustrates a flowchart of a method for repairing a GPU video memory access based on active error detection according to an embodiment of the present disclosure. For convenience of description, only a part related to this embodiment of the present disclosure is shown.

As shown in FIG. 1, the method for repairing the GPU video memory access based on active error detection provided in this embodiment includes following steps.

In step S1, a small video memory test space is distributed for a data read and write detection, which regularly and actively detect whether reading data from and writing data into the video memory test space is normal.

When being loaded, a GPU desktop driving module first distributes the small video memory test space, for example, when the GPU desktop driving module is loaded for an Xorg graphic desktop service, the GPU desktop driving module first distributes a small video memory test space for the data read and write detection on the video memory, and then regularly and actively detects whether read and write access to data in the video memory test space is normal. If the data read and write detection on the video memory test space succeeds, the access detection on the video memory test space is repeated regularly; otherwise, the data read and write detection on video memory fails. During specific implementation, the process is as follows.

In step S11, the small video memory test space is distributed for the data read and write detection, where the video memory test space is two times or four times a width of video memory data. If the width of video memory data is 64 bits, that is, 8 bytes, only video memory data of 16 bytes or 32 bytes need to be detected, and a size of the video memory test space is 16 bytes or 32 bytes.

In step S12, the data read and write detection on the video memory test space is triggered regularly, where the detection process includes: randomly writing a group of data into the video memory test space, and then reading the data and performing correctness verification on the data, where if the read data is consistent with the data previously written, it indicates that the read and write is normal, and if the read data is inconsistent with the previously written data, it indicates that the read and write detection fails.

The video memory regular detection may be triggered by setting a timer, for example, a timer for performing detection once every second is added, or a dedicated thread may be created for regularly performing the operation of video memory detection. Each detection mainly includes: randomly writing data, then reading data, and comparing whether the written data is consistent with the read data. If the written data is consistent with the read data, it indicates that the read and write is normal, and if the written data is inconsistent with the read data, the read and write detection fails. For example, read and write error detection is determined through a detection module. The group of data may be one piece of data or may be a plurality of pieces of data. If the group of data is the plurality of pieces of data, it is determined that the detection succeeds when read and write of various piece of data are consistent. As a specific example, each byte is written with full 0, and then is read out for determining; then is written with 0xff, and is determined; is written with 0x55, and is determined; and is written with 0xaa, and is determined. If the four times read and write are normal, it is determined that read and write is normal, otherwise, it is determined that the detection fails.

In step S2, if the data read and write detection on the video memory test space fails, a trigger instruction is transmitted to control the GPU desktop driving module to suspend the access operations to the video memory and control a GPU kernel driving module to suspend access operations of all hardware modules to the video memory, then a video memory controller is reset and re-initialized, to re-calibrate timing of a video memory interface, and finally the access operations of all the hardware modules to the video memory is restored and the access to the video memory interface is restored to normal. Herein, the hardware modules include a 2D module, a 3D module, a VPU module, a display controller, a DMA module, a command queue module, and the like.

If the read and write detection fails, the regular detection is suspended, the GPU desktop driving module first suspends all the access operations to the video memory of the module, which includes: graphic drawing, moving, reading, writing, and the like, and then, the GPU kernel driving module suspends the access operations of all the hardware modules to the video memory, where the suspending the access operations to the video memory includes, but not limited to: causing the 2D module and the 3D module of the GPU to enter a sleep state, suspending running of a video encoding and decoding module, suspending all the access operations of the DMA module to the video memory, and closing the access of the display controller to the video memory. The video memory controller is reset and re-initialized. Because the re-initialization process includes calibration of the timing of the video memory interface signal, a video memory access error caused by a failure of calibration of the timing can be repaired, and finally the access operations of all the hardware modules to the video memory interface are restored to normal.

Figure 2:
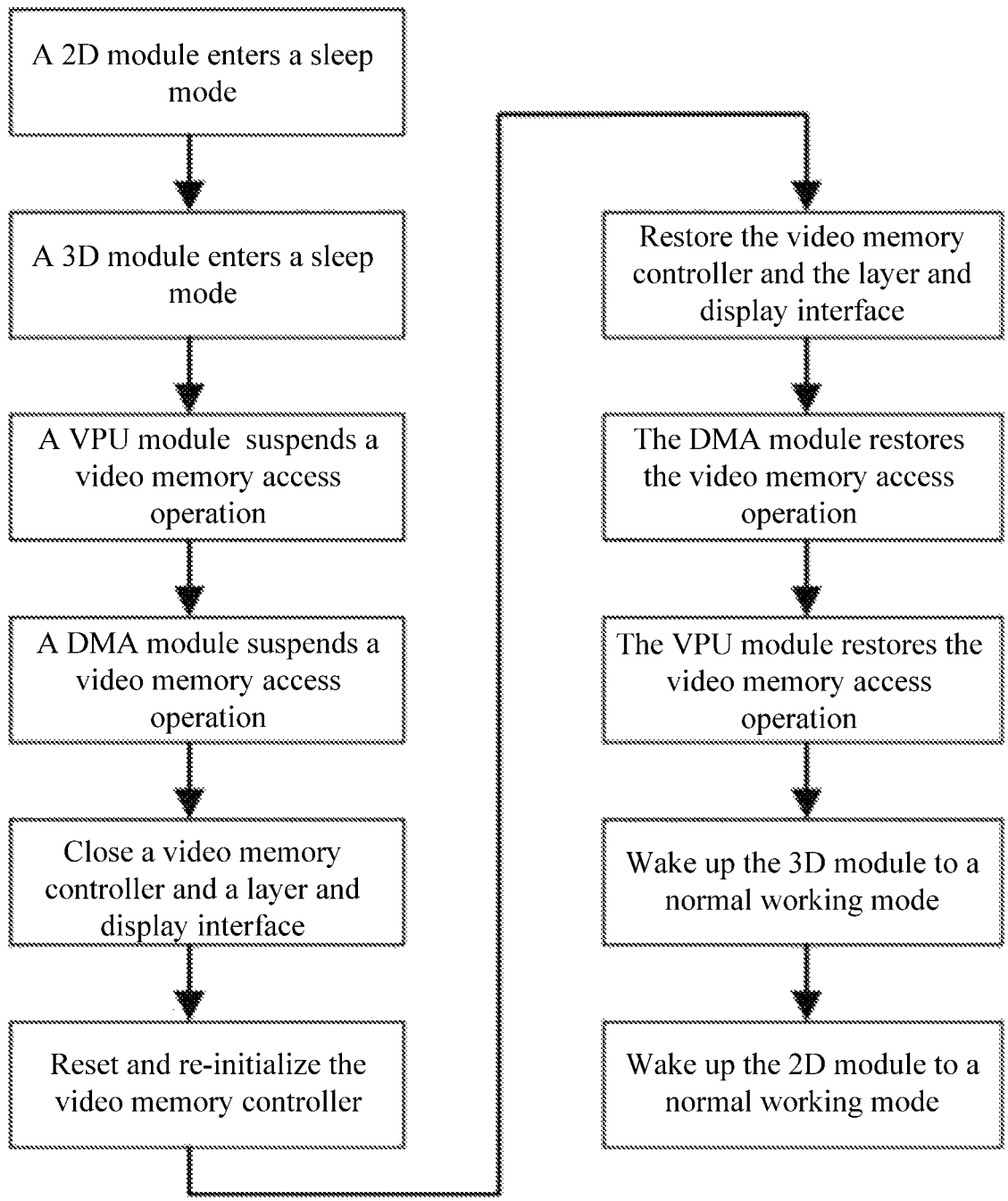
FIG. 2 is an execution process example of a GPU kernel driving module in step S2 according to an embodiment of the present disclosure.

In a specific example, as shown in FIG. 2, in step S2, after the GPU kernel driving module receives the trigger instruction, the GPU kernel driving module first suspends the access operations of the hardware modules such as the 2D module, the 3D module, the VPU module, the DMA module, and the video memory controller to the video memory, where the 2D module and the 3D module enters the sleep state; then resets and re-initializes the video memory controller and repairs a fault of the video memory controller; and finally restores the access operations of the hardware modules such as the video memory controller, the DMA module, the VPU module, the 3D module, and the 2D module to the video memory.

In step S3, the GPU desktop driving module performs a complete desktop refresh operation, and restores all access operations of the GPU desktop driving module to the video memory.

In this step, after normal access of the video memory interface is restored, the GPU desktop driving module performs the complete desktop refresh operation and restores subsequent the access operations of the module to the video memory to normal, to restore a graphic interface of an operating system to a normal state.

Specifically, this step is implemented in following processes: first a full screen update mark is set, to ensure that an entire desktop picture is updated when a desktop is updated next time instead of changing a picture of a current region and a possible blurred screen fault of a display is repaired; and then an operation process of the graphics desktop drawing is restored to the normal state, and the regular data read and write detection on the video memory test space is restored.

In this embodiment, the data read and write detection is regularly performed on the video memory test space, once a read and write abnormality is detected, an update of desktop display and all the access operations to the video memory are first suspended, which include, but not limited to: causing the 2D module and the 3D module of the GPU to enter the sleep state, suspending the operation of the DMA module on the video memory, and closing the access of the display controller to the video memory; then the video memory controller is re-initialized, where the timing of the video memory access is re-calibrated during initialization; after the video memory controller is initialized, all the access operations of the GPU to the video memory are restored, the graphic desktop service program is notified to refresh the desktop, and a display picture is restored to the normal state.

Embodiment 2

Figure 3:
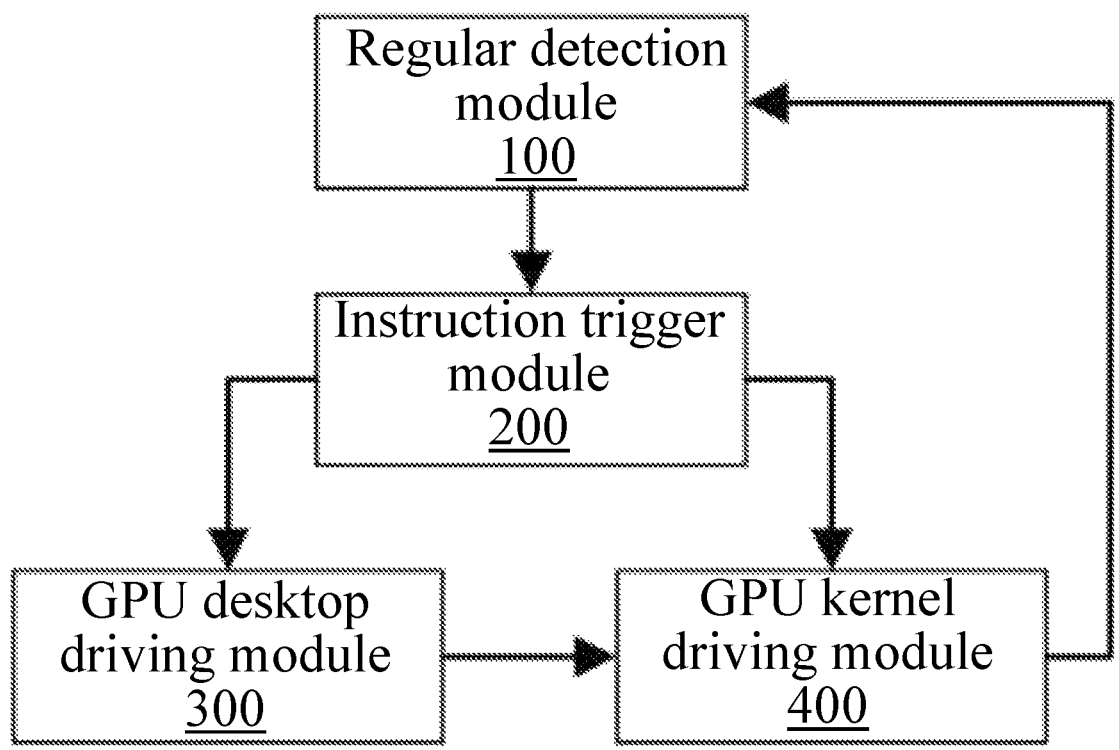
FIG. 3 is a structural block diagram of an apparatus for repairing a GPU video memory access based on active error detection according to a second embodiment of the present disclosure.

FIG. 3 illustrates a structure of an apparatus for repairing a GPU video memory access repairing apparatus based on active error detection according to an embodiment of the present disclosure. For convenience of description, only a part related to this embodiment of the present disclosure is shown.

As shown in FIG. 3, the GPU video memory access repairing apparatus based on active error detection provided in this embodiment includes:

a regular detection module 100, configured to distribute a small video memory test space for a data read and write detection, and to regularly and actively detect whether read and write of data in the video memory test space is normal;

an instruction trigger module 200, configured to transmit a trigger instruction when the data read and write detection on the video memory test space fails;

a GPU desktop driving module 300, configured to suspend access operations to the video memory when receiving the trigger instruction, and to perform a complete desktop refresh operation after an access to a video memory interface is restored to normal, and restore all the access operations to the video memory; and a GPU kernel driving module 400, configured to suspend access operations of all hardware modules to the video memory when receiving the trigger instruction, then reset and re-initialize a video memory controller, to re-calibrate timing of the video memory interface, and finally restore the access operations of all the hardware modules to the video memory and restore the access to the video memory interface to normal.

In this structure, the regular detection module and the instruction trigger module adopted an active detection mechanism on errors of video memory access and may be designed into independent detection modules or may be implanted into the GPU desktop driving module, which both fall into the protection scope of this embodiment. The above four function modules implement step S1 to step S3 in Embodiment 1, and a specific execution process is not described herein again.

As a preferred structure, the regular detection module 100 includes:

a video memory distribution unit, configured to distribute the small video memory test space for the data read and write detection, where the video memory test space is two times or four times a width of video memory data; and a regular detection unit, configured to regularly trigger the data read and write detection on the video memory test space, where the detection includes: randomly writing a group of data into the video memory test space, and then reading the data and performing correctness verification on the data, where if the read data is consistent with the previously written data, it indicates that the read and write is normal, and if the read data is inconsistent with the previously written data, it indicates that the read and write detection fails.

The GPU kernel driving module includes:

a module suspending unit, configured to suspend the access operations of the hardware modules such as a 2D module, a 3D module, a VPU module, a DMA module, and the video memory controller to the video memory;

a controller initialization unit, configured to reset and re-initialize the video memory controller; and a module restoration unit, configured to restore the access operations of the hardware modules such as the video memory controller, the DMA module, the VPU module, the 3D module, and the 2D module to the video memory.

Based on the foregoing, in the embodiments of the present disclosure, by providing a GPU active error detection mechanism, which finds problems of the video memory access through the regular and active detection, and then starts some operations related to the video memory controller, and which include suspending the video memory access, re-initializing the video memory controller, restoring the video memory access, refreshing graphics desktop, and the like, to restore the video memory access and remove the display fault. In the prior art, although the timing may be improved by re-designing a circuit board, the problem cannot be resolved or alleviated. If advanced GPU video memory controllers supporting dynamic timing calibration are purchased and GPU chips are taped out again, a costs are very high. In the present disclosure, without changing a hardware, the defect problem of the hardware is repaired through the software driving, a stability and a user experience of the GPU system are improved without changing the hardware, which is a good error avoidance solution.

The above described are merely preferred examples of the present disclosure, and are not intended to limit the present disclosure. Any modification, equivalent substitution, and improvement without departing from the spirit and principle of the present disclosure shall be included within the protection scope of the present disclosure.

What is claimed is:

1. A method of repairing access to a graphics processing unit (GPU) video memory based on active error detection, the method comprising:

allocating a video memory test space on which data read and write detection is performed, detecting, with a predetermined frequency, whether read and write of data in the video memory test space is normal, and triggering, with a predetermined frequency, the data read and write detection on the video memory test space, wherein the video memory test space is two times or four times a width of video memory data, wherein the detecting comprises:

randomly writing a group of data to the video memory test space, the group of data being written data, and reading out the written data as read data and performing correctness verification on the read data, such that when the read data is consistent with the written data, correctness verification indicates that the read and write of data is normal, and when the read data is inconsistent with the written data, correctness verification indicates that the data read and write detection fails;

when the correctness verification indicates that the data read and write detection on the video memory test space fails, performing repair operations of access to the GPU video memory comprising:

transmitting a trigger instruction to control a GPU desktop driving module to suspend access operations to the GPU video memory and control a GPU kernel driving module to suspend access operations of all hardware modules to the GPU video memory, re-calibrating timing of a video memory interface by resetting and re-initializing a video memory controller, and restoring the access operations of all the hardware modules to the GPU video memory and restoring an access to the video memory interface to normal; and performing, by the GPU desktop driving module, a desktop refresh operation after restoring the access to the video memory interface to normal, and restoring all access operations of the GPU desktop driving module to the GPU video memory, comprising operations:
  setting a full screen update mark to ensure that an entire desktop picture is updated in next desktop updating,
  restoring a graphic desktop drawing operation process to normal, and
  restoring the data read and write detection on the video memory test space.

2. The method according to claim 1, wherein after receiving the trigger instruction, the GPU kernel driving module performs operations comprising:
  suspending the access operations of the hardware modules including a 2D module, a 3D module, a video processing unit (VPU) module, a direct access media (DMA) module, and the video memory controller to the GPU video memory;
  resetting and re-initializing the video memory controller; and
  restoring the access operations of the hardware modules including the 2D module, the 3D module, the VPU module, the DMA module, and the video memory controller to the GPU video memory.

3. An apparatus to repair access to a graphics processing unit (GPU) video memory based on active error detection, the apparatus comprising:
  a regular detection module configured to allocate a video memory test space on which data read and write detection is performed, configured to detect, with a predetermined frequency, whether read and write of data in the video memory test space is normal, wherein the video memory test space is two times or four times a width of video memory data, and configured to trigger, with a predetermined frequency, the regular detection module to perform the data read and write detection on the video memory test space, wherein the detecting comprises:
    randomly writing a group of data to the video memory test space, the group of data being written data, and
    reading out the written data as read data and performing correctness verification on the read data, such that when the read data is consistent with the written data, correctness verification indicates that the read and write of data is normal, and when the read data is inconsistent with the written data, correctness verification indicates that the data read and write detection fails;
  an instruction trigger module configured to transmit a trigger instruction when the correctness verification indicates that the data read and write detection on the video memory test space fails;
  a GPU desktop driving module, when receiving the trigger instruction, configured to perform repair operations of access to the GPU video memory comprising:
    suspending access operations to the GPU video memory,
    performing a desktop refresh operation after restoring an access to a video memory interface to normal, and restoring all access operations to the GPU video memory, comprising: setting a full screen update mark to ensure that an entire desktop picture is updated in next desktop updating; restoring a graphic desktop drawing operation process to normal, and restoring the data read and write detection on the video memory test space; and
  a GPU kernel driving module, when receiving the trigger instruction, configured to perform repair operations of access to the GPU video memory comprising:
    suspending access operations of all hardware modules to the GPU video memory,
    re-calibrating timing of the video memory interface by resetting and re-initializing a video memory controller, and
    restoring the access operations of all the hardware modules to the GPU video memory and restoring the access to the video memory interface to normal.

4. The apparatus according to claim 3, wherein the regular detection module comprises a video memory distribution unit configured to distribute the small video memory test space for the data read and write detection.

5. The apparatus according to claim 4, wherein the GPU kernel driving module comprises:
  a module suspending unit configured to suspend the access operations of the hardware modules including a 2D module, a 3D module, a video processing unit (VPU) module, a direct access media (DMA) module, and the video memory controller to the GPU video memory;
  a controller initialization unit configured to reset and re-initialize the video memory controller; and
  a module restoration unit configured to restore the access operations of the hardware modules including the 2D module, the 3D module, the VPU module, the DMA module, and the video memory controller to the GPU video memory.

6. The apparatus according to claim 3, wherein the regular detection module comprises a regular detection unit configured to trigger, with the predetermined frequency, the data read and write detection on the video memory test space.

* * * * *